Feb. 6, 1934.  C. A. ROSS  1,945,705
MEANS FOR HEATING A CONTAINER ELECTRICALLY
Filed Oct. 24, 1932
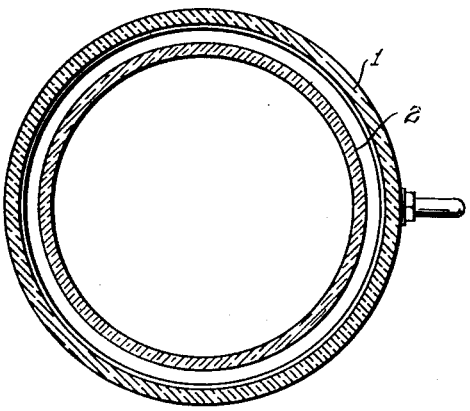
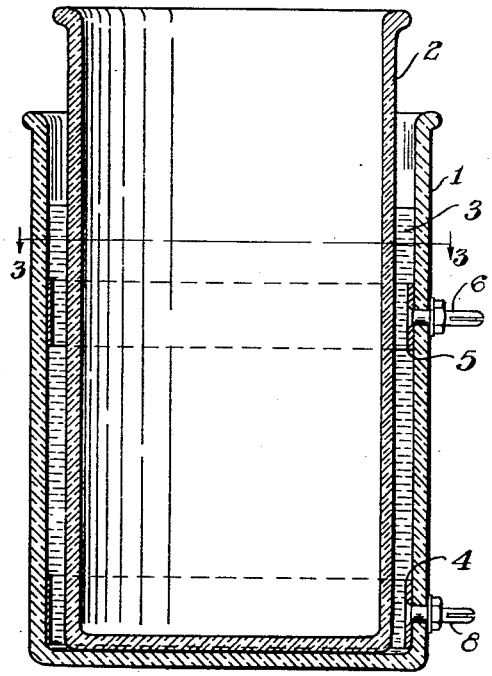
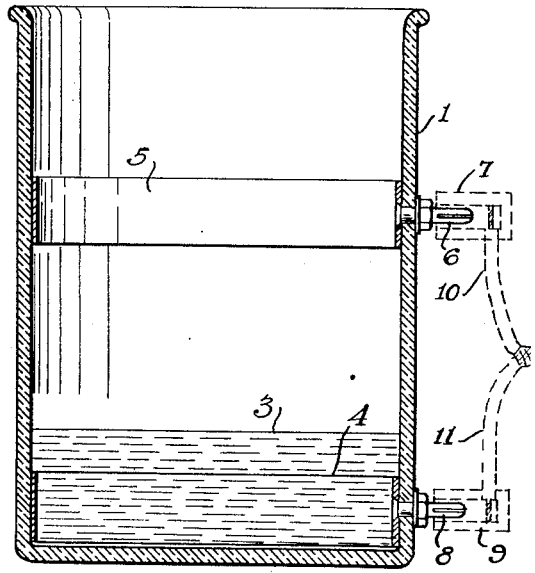
INVENTOR,
Carroll A. Ross
BY
Howard S. Smith
His ATTORNEY Patented Feb. 6, 1934

1,945,705

UNITED STATES PATENT OFFICE 1,945,705

MEANS FOR HEATING A CONTAINER ELECTRICALLY

Carroll A. Ross, Piqua, Ohio

Application October 24, 1932. Serial No. 639,203

2 Claims. (Cl. 219—40)

This invention relates to a new and useful method of, and means for, heating a container electrically.

It is the principal object of my invention to provide for heating nursing bottles, invalid food receptacles, hot drink and other containers, an outside vessel partly filled with a solution through which an electric current passes upon the insertion of the inner container. On the inside surface of the outside vessel are two electrodes which are disposed one above the other so that when the inner container is inserted, it will raise the level of the conducting liquid above the upper electrode to close an electric circuit through it; and when that container is withdrawn, the liquid will descend below the upper electrode to open that circuit. In other words, the liquid becomes a hydraulic switch to close and open an electric heating circuit for the contents of the inner container when the latter is placed within and taken out of the outside vessel.

The advantages of this control of the heating unit by the insertion and withdrawal of the inner container are many. It enables the current to be "turned on" by the single operation of placing a nursing bottle, for example, in the heating liquid, and to be "turned off" by the mere removal of that bottle. It further effects the automatic opening of the electric heating circuit if the heater is left turned on, since under this condition the solution will eventually boil away to a point where it descends below the top electrode to open that circuit.

Other important and incidental objects will be brought out in the following specification and particularly set forth in the subjoined claims.

In the accompanying drawing illustrating one form of embodiment of my invention, Figure 1 is a vertical sectional view taken through the outer vessel after the inner one has been inserted far enough therein to raise the level of the conducting fluid to the upper electrode. Figure 2 is a vertical sectional view taken through the outer vessel after the inner one has been removed, showing how the level of the conducting fluid has descended below the top electrode to open the electric heating circuit through that fluid. And Figure 3 is a horizontal sectional view taken through the outer and inner vessels on the line 3—3 of Figure 1.

Referring to the accompanying drawing for a detailed description of the invention, the numeral 1 designates an outer vessel or container made of materials such as glass and enameled iron that do not conduct electricity. It need not be a good conductor of heat.

Adapted to fit into the outer vessel 1 is an inner container 2 also constructed of materials that do not conduct electricity. The inner container is of a size to fit within the outer vessel 1 so as to leave between them a space to receive a good conducting liquid 3 such as salt water.

Secured within the outer vessel 1 are two vertical spaced electrodes such as the bands 4 and 5. The band electrode 4 is preferably near the bottom of the outer vessel 1 while well above it is the upper band electrode 5. From the latter there protrudes through a hole in the side of the vessel 1, an electrical connection 6 which is formed at its outer end to receive a plug 7. A similar electrical connection 8 projects through a hole in the wall of the outer vessel to receive a plug 9. By wires 10 and 11 respectively, the plugs 8 and 9 are connected to a source of electric current (not shown).

The outer vessel 1 is preferably filled with the conducting fluid 3 to the level indicated in Figure 2. Although it may be filled to a higher level, the requisite is that it does not reach the upper electrode 5, since it is the purpose of the invention to effect this result by the insertion of the inner container. The liquid 3 thus becomes a hydraulic switch to close the electric circuit between the two electrodes when the inner container is inserted in the outer vessel. The salt solution is then heated by the current which flows through it to heat in turn the baby's food, invalid's food, hot drinks or the like within the inner container.

If the heater is left turned on by mistake, the salt water 3 will eventually boil away to a point below the upper electrode, thus opening the electric circuit to turn the heater off automatically. Under normal conditions, however, the brine solution, whose heating rate can be varied by altering its strength, does not rise to the boiling point.

After the contents of the inner container 1 have been heated to the desired degree, it may be easily taken out, whereupon the level of the liquid 3 in the outer vessel will descend below the upper electrode 5 to turn the heater off.

It is thus seen that I have provided for baby bottles, invalid food, hot drink and other containers, a simple and efficient electric heater which is turned on and off by the mere insertion and removal of the bottle, or other container, to be heated.

I do not wish to be limited to the details of construction and arrangement herein shown and described, and any changes or alterations may be made therein within the scope of the subjoined claims.

Having described my invention, I claim:

1. The combination with an outer vessel, of an inner container adapted to be inserted therein, two vertically spaced electrodes on the inner surface of said outer vessel, an electric circuit including said electrodes, and a conducting liquid in said outer vessel, said liquid covering the lower electrode and adapted to be raised by the insertion of the inner container to contact the upper electrode and thereby close the electric circuit between the electrodes to heat said liquid and through it the contents of the inner container.

2. The combination with an outer vessel, of an inner container adapted to be inserted therein, a band electrode within the outer vessel near its bottom, a second band electrode within said vessel well above the first electrode, an electric circuit including said electrodes and a conducting liquid covering the lower electrode and adapted to be raised by the insertion of the inner container to contact the upper electrode and thereby close the electric circuit between the electrodes to heat said liquid and through it the contents of the inner container.

CARROLL A. ROSS.